(12) United States Patent
Seto et al.

(10) Patent No.: US 6,175,488 B1
(45) Date of Patent: Jan. 16, 2001

(54) ELECTRONIC APPARATUS WITH COVER FOR COVERING DETACHABLE FUNCTIONAL COMPONENT

(75) Inventors: Masaru Seto; Atsushi Tatemichi, both of Tokyo (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/069,083

(22) Filed: Apr. 29, 1998

(30) Foreign Application Priority Data

May 7, 1997 (JP) ..................................... 9-116863

(51) Int. Cl.[7] ................ H05K 5/00; H05K 7/00
(52) U.S. Cl. ............... 361/683; 361/686; 361/724; 312/223.1; 312/223.2
(58) Field of Search ..................... 361/683, 686, 361/724, 680; 312/223.1, 223.2

(56) References Cited

U.S. PATENT DOCUMENTS

| | | |
|---|---|---|
| 5,196,687 | 3/1993 | Sugino et al. . |
| 5,345,362 * | 9/1994 | Winkler ............................. 361/681 |
| 5,443,320 | 8/1995 | Agata et al. . |
| 5,526,226 | 6/1996 | Katoh et al. . |
| 5,761,034 * | 6/1998 | Chu ................................. 361/687 |
| 5,844,772 * | 12/1998 | Lee et al. ......................... 361/683 |

FOREIGN PATENT DOCUMENTS

| | | |
|---|---|---|
| 7-219682 | 8/1995 | (JP) . |
| 7-325642 | 12/1995 | (JP) . |

* cited by examiner

*Primary Examiner*—Leo P. Picard
*Assistant Examiner*—Tung Minh Bui
(74) *Attorney, Agent, or Firm*—Finnegan, Henderson, Farabow, Garrett & Dunner, L.L.P.

(57) ABSTRACT

An electronic apparatus comprises a receptacle for removably receiving a functional component, and an opening portion for insertion/removal of the functional component into/from the receptacle, and a cover attached to the housing to cover the opening portion. The cover is movable between a first position where the cover covers the opening portion and a second position where the cover is-shifted away from the opening portion. The cover is coupled to the housing by means of a flexible coupling member.

14 Claims, 8 Drawing Sheets

ELECTRONIC APPARATUS WITH COVER FOR COVERING DETACHABLE FUNCTIONAL COMPONENT

BACKGROUND OF THE INVENTION

The present invention relates generally to an electronic apparatus and more particular to a structure for attaching a cover which is opened/closed when the user additionally provides a memory or replacing a functional component such as a battery pack.

A portable computer, known as a portable electronic apparatus, comprises a computer body and a display unit supported on the computer body. The computer body has a flat box-shaped housing. A keyboard is disposed on the upper surface of the housing.

This type of portable computer is provided with a palm-rest. The palm-rest enhances the operability of the keyboard when used by the operator, or alleviates fatigue of the operator's arms or hands. The palm-rest is located at a front end portion of the housing.

There is also known a conventional portable computer wherein a receptacle, which can accommodate various types of functional components such as a battery pack, a hard-disk drive or a PC card, is formed within the housing and this receptacle is positioned below the palm-rest. In this portable computer, the palm-rest serves also as a cover for opening/closing the receptacle. Accordingly, in most cases, the palm-rest is rotatably or detachably supported on the housing.

In the computer with the rotatable palm-rest, the palm-rest is provided with shaft portions, and bearing holes are formed in the housing. The shaft portions are engaged in the bearing holes so as to be rotatable about their own axes. The palm-rest is thus coupled to the housing. On the other hand, in the computer with the detachable palm-rest, the palm-rest is provided with a plurality of engaging claws at its peripheral portion. These engaging claws are detachably hooked on the housing.

In the case where the rotatable palm-rest is used, engaging portions between the shaft portions and bearing holes are disposed, being spaced apart from each other in the width direction of the palm-rest. These engaging portions are positioned near the boundary between the keyboard and palm-rest. Thus, the palm-rest can be rotated on the shaft portions between a first position where the palm-rest covers the receptacle from above and a second position where the palm-rest turns upward of the keyboard from the receptacle.

According to the conventional portable computer, however, the palm-rest is located immediately before the keyboard. As a result, there is a concern that when the palm-rest has been rotated from the first position to the second position, the palm-rest may interfere with the foremost row of keys of the keyboard. Because of this, the rotational angle of the palm-rest is limited and the palm-rest is permitted to rotate only up to such a degree that the palm-rest is erected just before the keyboard. As a result, the receptacle cannot be widely opened to the above region of the housing, and the palm-rest hinders smooth insertion/removal of the functional component in/from the receptacle.

There is an idea that the angle of opening of the palm-rest is increased by coupling the palm-rest and the housing by means of a link mechanism. In this structure, however, a special link mechanism is required. The structure of the coupling portions of the palm-rest becomes intricate, and a special space for receiving the link mechanism needs to be provided within the housing. Consequently, it becomes very difficult to reduce the manufacturing cost and the size and weight of the housing.

In the case of the portable computer with the detachable palm-rest, it is possible to completely separate the palm-rest from the housing and to widely open the receptacle to the above region of the housing. In this case, however, since the palm-rest is separated from the housing, there is a need to provide a special place for keeping the separated palm-rest. Besides, there is a possibility that the palm-rest may be lost. Furthermore, in order to prevent a theft of the palm-rest, it is necessary to provide the housing with a mechanism for locking the palm-rest. The structure of the housing becomes inevitably intricate and the number of parts increases.

In modern portable computers, a click switch button and a click switch operated by the button are provided at a central portion of the palm-rest. The click switch is electrically connected to a circuit board over a cable within the housing. If the palm-rest is detached from the housing while the presence of the cable is forgotten, a strong tensile force acts on the cable and the cable may be cut or the connecting portion between the cable and the click switch or circuit board may be broken.

BRIEF SUMMARY OF THE INVENTION

A first object of the present invention is to provide an electric apparatus wherein a receptacle of a housing can be widely opened so that a functional component can be easily contained in or taken out of the receptacle, the number of parts is reduced with simple construction, and a theft of a cover is prevented.

A second object of the invention is to provide an electronic apparatus wherein breakage or damage of a wiring member can be prevented, in addition to the advantages obtained by the achievement of the first object.

In order to achieve the first object, the present invention provides an electronic apparatus comprising:

a housing including a receptacle for removably receiving a functional component, and an opening portion for inserting/taking out the functional component into/from the receptacle;

a cover attached to the housing to cover the opening portion of the housing, the cover being movable between a first position where the cover covers the opening portion and a second position where the cover is shifted away from the opening portion; and a flexible coupling member for coupling the housing and the cover.

In the above structure, when the functional component is contained in or taken out of the receptacle of the housing, the cover is shifted from the first position to the second position and the cover is disengaged from the housing. In this case, since the coupling member for coupling the cover and the housing has flexibility, it can be bent at a desired position in a desired shape. Thus, the cover can be freely moved to a position remote from the opening portion and the surrounding of the opening portion can be widely opened. As a result, the cover does not hinder the insertion/removal of the functional component in/from the receptacle, and the work for inserting/taking out the functional component is facilitated.

In addition, according to this structure, the cover is merely coupled to the housing by a flexible coupling member, there is no need to provide an intricate link mechanism at a coupling portion between the cover and the housing, or a special lock mechanism for preventing a theft of the cover.

Furthermore, since the cover is coupled to the housing by means of the coupling member, the cover is not completely separated from the housing and the loss or theft of the cover can be prevented.

In order to achieve the second object, the invention provides a electronic apparatus comprising:

a housing containing a circuit board;

a receptacle formed in the housing and removably receiving a functional component, the receptacle having an opening portion;

a cover attached to the housing to cover the opening portion of the housing from the above side of the housing, the cover being movable between a first position where the cover covers the opening portion and a second position where the cover is shifted away from the opening portion, the cover including a manually operable switch member and a switch which is turned on/off by means of the switch member, the switch being electrically connected to the circuit board by means of a wiring member; and a flexible coupling member for coupling the housing and the cover.

In the above structure, when the functional component is contained in or taken out of the receptacle of the housing, the cover is shifted from the first position to the second position and the cover is disengaged from the housing. In this case, since the coupling member for coupling the cover and the housing has flexibility, it can be bent at a desired position in a desired shape. Thus, the cover can be freely moved to a position remote from the opening portion and the surrounding of the opening portion can be widely opened. As a result, the cover does not hinder the insertion/removal of the functional component in/from the receptacle, and the work for inserting/taking out the functional component is facilitated.

In addition, according to this structure, the cover is merely coupled to the housing by a flexible coupling member, there is no need to provide an intricate link mechanism at a coupling portion between the cover and the housing, or a special lock mechanism for preventing a theft of the cover.

If the cover is moved away from the housing to a position corresponding to the length of the coupling member, the coupling member is pulled to a maximum length and further movement of the cover from the housing is prevented. Thus, when the cover is moved to the second position, a great tensile force does not act on the wiring member and an excessive force does not act on a connecting portion between the wiring member and a switch or circuit board. Therefore, breakage of the wiring member or damage of the connecting portion can be prevented, the reliability of electrical connection is enhanced.

In order to achieve the second object, the invention also provides an electronic apparatus comprising:

a housing including a top wall on which input means for inputting information is disposed, a receptacle for removably receiving a functional component, and an opening portion for insertion/removal of the functional component in/from the receptacle, the opening portion being located in front of the input means;

a circuit board contained in the housing;

a palm-rest attached to the housing on an operator's side of the input means, the palm-rest being movable between a first position where the palm-rest covers the opening portion and a second position where the palm-rest is shifted away from the opening portion, the palm-rest including first and second end portions spaced apart in a width direction of the housing, a switch member situated between the first and second end portions and a switch which is turned on/off by means of the switch member, the switch being electrically connected to the circuit board by means of a wiring member; and a pair of flexible coupling members for coupling the housing and the first and second end portions of the palm-rest.

In the above structure, when the functional component is contained in or taken out of the receptacle of the housing, the palm-rest is shifted from the first position to the second position and the palm-rest is disengaged from the housing. In this case, since the coupling member for coupling the cover and the housing has flexibility, it can be bent at a desired position in a desired shape. In addition, since the coupling member couples the palm-rest and housing at two locations spaced apart in the width direction of the housing, the attitude of the palm-rest is stabilized at the time of movement of the palm-rest. Thus, the palm-rest can be freely moved at an attitude inclined forward or backward of the opening portion, and the surrounding of the opening portion can be widely opened. As a result, the palm-rest does not hinder the insertion/removal of the functional component in/from the receptacle, and the work for inserting/taking out the functional component is facilitated.

In addition, according to this structure, the palm-rest is merely coupled to the housing by a flexible coupling member, there is no need to provide an intricate link mechanism at a coupling portion between the palm-rest and the housing, or a special lock mechanism for preventing a theft of the palm-rest.

If the palm-rest is moved away from the housing to a position corresponding to the length of the coupling member, the coupling member is pulled to a maximum length and further movement of the palm-rest from the housing is prevented. Thus, when the palm-rest is moved to the second position, a great tensile force does not act on the wiring member and an excessive force does not act on a connecting portion between the wiring member and a switch or circuit board. Therefore, although the palm-rest is constructed to be separable from the housing, breakage of the wiring member or damage of the connecting portion can be prevented and the reliability of electrical connection is enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention, in which the invention is applied to a portable computer, will now be described with reference to FIGS. 1 to 7B.

Figure 1:
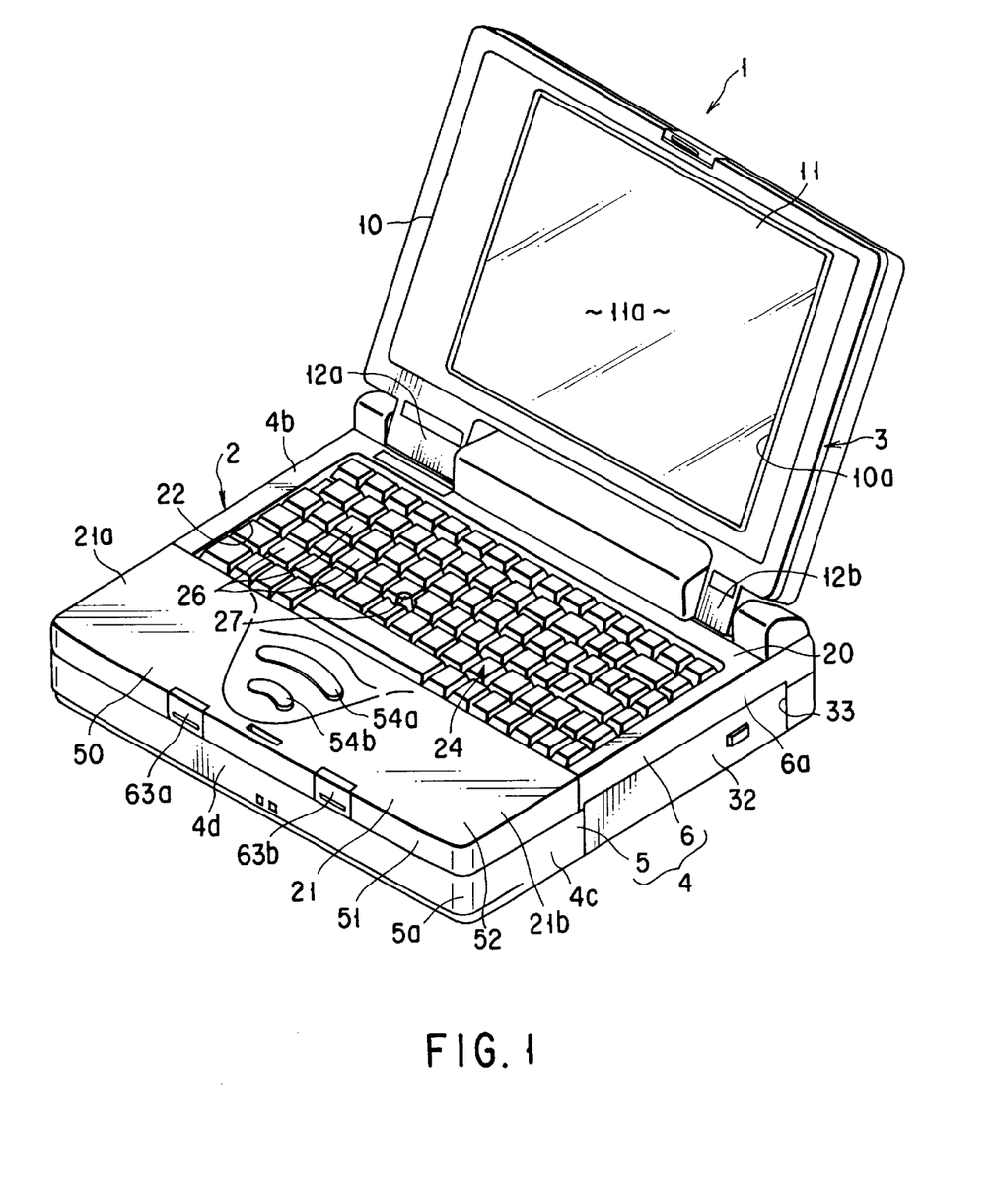
FIG. 1 is a perspective view of a portable computer according to a first embodiment of the present invention.

FIG. 1 shows a book-type portable computer 1 as an electronic apparatus. The portable computer 1 comprises a computer body 2 and a display unit 3 supported on the computer body 2. The computer body 2 includes a housing 4 of a synthetic resin. The housing 4 includes a bottom wall 4a, a top wall 4b, right and left side walls 4c (only the right one shown), a front wall 4d and a rear wall (not shown). The housing 4 has a flat box shape.

The housing 4 comprises a lower housing 5 and an upper housing 6 coupled to the lower housing 5. The lower housing 5 comprises the bottom wall 4a and four peripheral walls 5a extending upward from the peripheral edge of the bottom wall 4a. The upper housing 6 comprises the top wall 4b and four peripheral walls 6a extending downward from the peripheral edge of the top wall 4b. The peripheral walls 5a of lower housing 5 and the peripheral walls 6a of upper housing 6 cooperate to constitute the side walls 4c, front wall 4d and rear wall of the housing 4.

The display unit 3 includes a flat box-shaped display housing 10 and a liquid crystal display (LCD) 11 received in the display housing 10. The display housing 10 has a front surface in which a display opening portion 10a is formed. A display screen 11a of LCD 11 is exposed to the outside of display housing 10 through the opening portion 10a of the front surface.

The display housing 10 includes a pair of leg portions 12a and 12b extending toward the housing 4. The leg portions 12a and 12b are spaced apart from each other in the width direction of the housing 4. The leg portions 12a and 12b are rotatably coupled to a rear end portion of the housing 4 by means of hinge devices (not shown). Accordingly, the display unit 3 is rotatable between a closed position where the display unit 3 is turned down to cover the upper wall 4b of housing 4, and an open position where the display unit 3 is erected at the rear end portion of the top wall 4b.

Figures 3, 4:
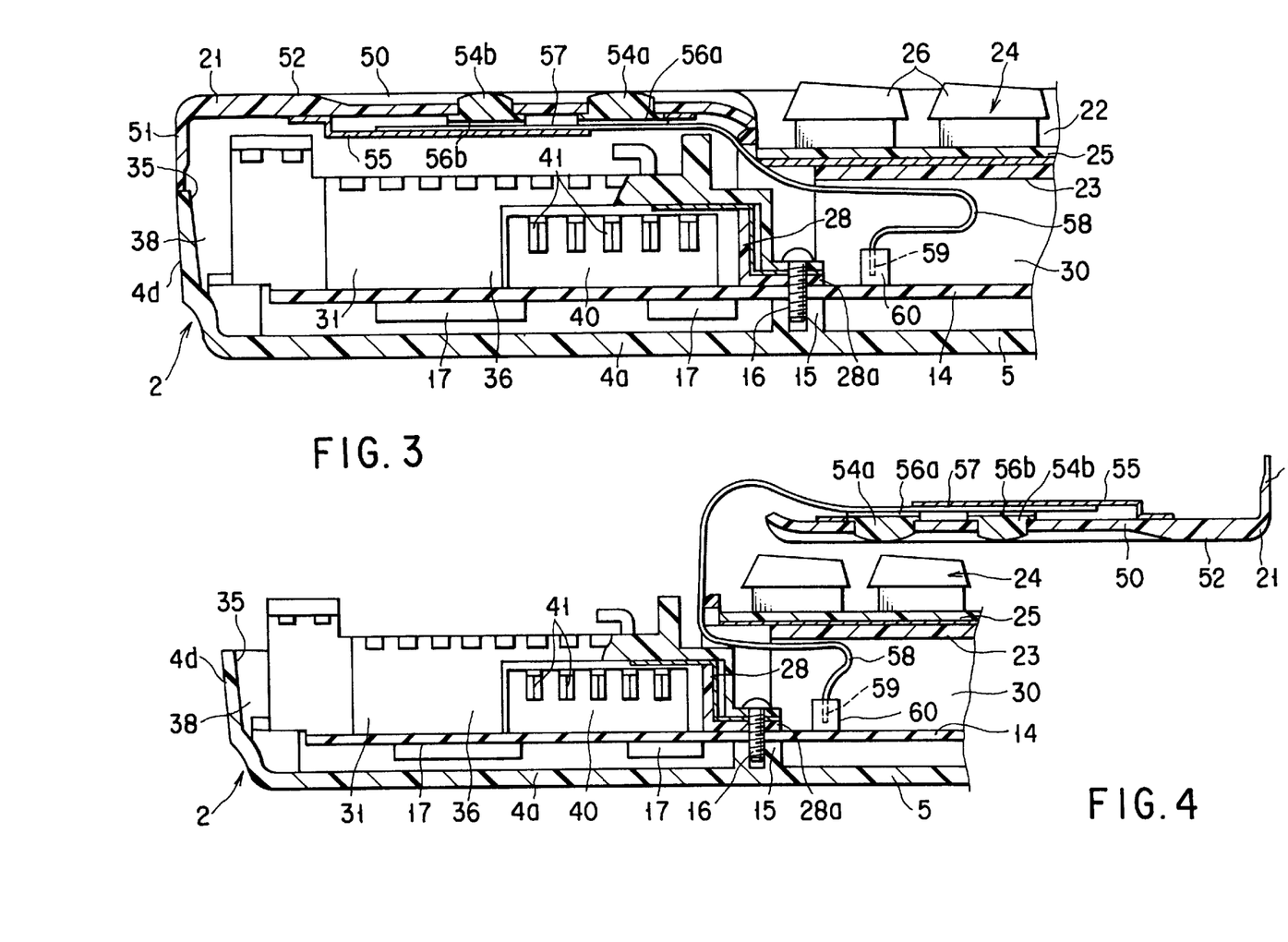
FIG. 3 is a cross-sectional view of the portable computer in the state in which the front cover is shifted to the first position and the opening portion of the housing is covered.
FIG. 4 is a cross-sectional view of the portable computer in the state in which the front cover is shifted to the second position and the opening portion of the housing is exposed.

As is shown in FIG. 3, a circuit board 14 is contained within the housing 4. The circuit board 14 is fixed to a boss portion 15 on the bottom wall 4a by means of a screw 16 such that the board 14 is situated in parallel to the bottom wall 4a. Various circuit components 17 such as a DRAM are mounted on the circuit board 14.

Figure 2:
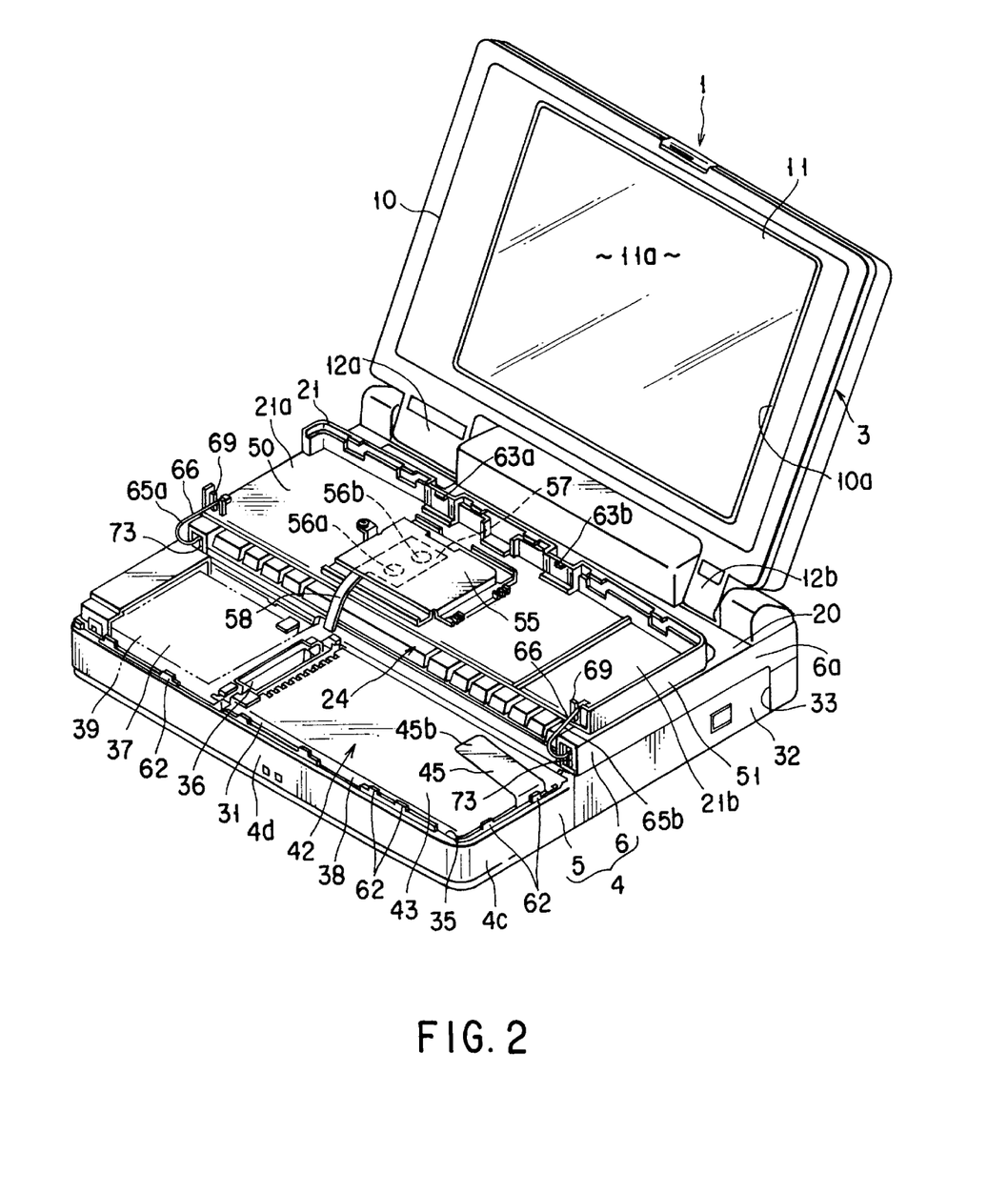
FIG. 2 is a perspective view of the portable computer in the state in which the front cover is shifted to the second position and the opening portion of the housing is exposed.

The upper housing 6 of housing 4, as shown in FIGS. 1 and 2, includes a housing body 20 and a front cover 21 continuous with a front end portion of the housing body 20. The housing body 20 is detachably coupled to the rear half portion of the lower housing 5. The housing body 20 includes a keyboard mount portion 22. The keyboard mount portion 22 is formed by a recess portion extending over substantially the entire area of the upper surface of the housing body 20. The keyboard mount portion 22 has a flat bottom wall 23. A front end of the keyboard mount portion 22 is open to the front end of the housing body 20.

A keyboard 24 serving as information input means is mounted in the keyboard mount portion 22. The keyboard 24 comprises a keyboard panel 25, a number of key-tops 26 arranged on the top surface of the keyboard panel 25, and a joystick 27 which is a kind of pointing device. The keyboard panel 25 is placed over the bottom wall 23 of keyboard mount portion 22. A rear edge portion of the keyboard panel 25 is detachably hooked on the keyboard mount portion 22. The key-tops 26 and joystick 27 are exposed to the outside of the housing body 20.

Figure 5:
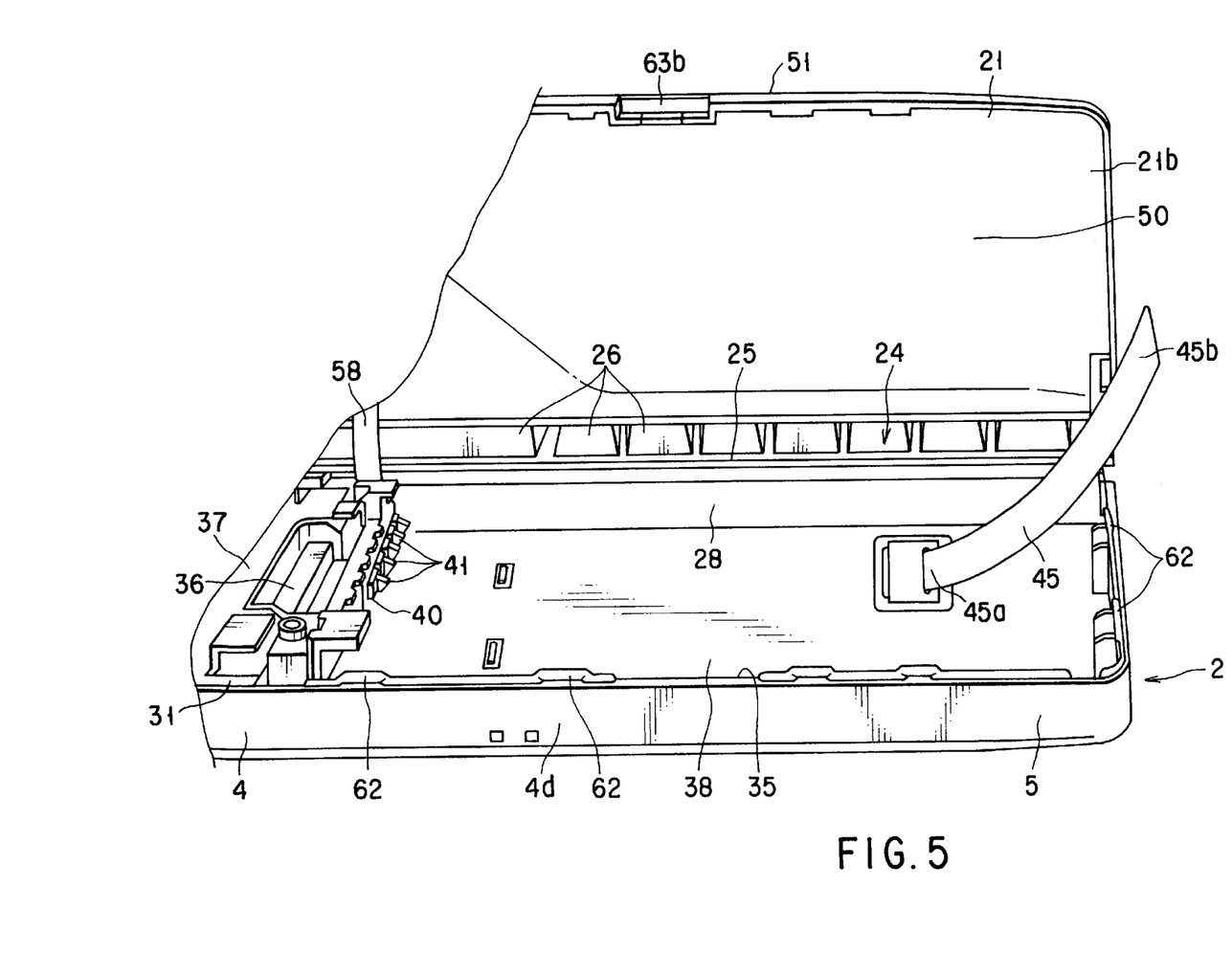
FIG. 5 is a perspective view showing a battery container in the housing.

As is shown in FIGS. 3 and 5, the bottom wall 23 of keyboard mount portion 22 has a partition wall 28 extending downward at the front end of the bottom wall 23. A lower end portion 28a of partition wall 28 is superposed on the upper surface of the circuit board 14 and fixed to the boss portion 15 by means of the screw 16. The partition wall 28 extends in the width direction of the housing 4. The partition wall 28 divides the inside of the housing 4 into a first receptacle 30 and a second receptacle 31. The circuit board 14 extends below both the first and second receptacles 30 and 31.

The first receptacle 30 is located below the keyboard mount portion 22. A CD-ROM drive 32 is put in the first receptacle 30. The first receptacle 30 has an insertion port 33. The insertion port 33 is formed in the right-hand side wall 4c of housing 4. Accordingly, the CD-ROM drive 32 is removably inserted into the first receptacle 30 through the insertion port 33.

The second receptacle 31 extends in the width direction of the housing 4 in front of the first receptacle 30. The second receptacle 31 has an opening portion 35. The opening portion 35 is opened upward of the housing 4 immediately before the keyboard 24. As is shown in FIG. 2, the second receptacle 31 is divided by a holder 36 into a board container 37 and a battery container 38. The board container 37 and battery container 38 are juxtaposed in the width direction of the housing 4, and both communicate with the opening portion 35. An audio board 39 is put in the board container 37. The audio board 39 is fixed to the bottom surface of the board container 37 by means of screws. The audio board 39 can be taken out of the housing 4 through the opening portion 35 by unscrewing it from the board container 37.

As is shown in FIGS. 3 and 5, a battery connector 40 is disposed in the battery container 38. The battery connector 40 is located at one end portion of the battery container 38, adjacent to the holder 36. The battery connector 40 has a plurality of connection terminals 41 exposed to the battery container 38. The battery connector 40 is mounted on the upper surface of the circuit board 14.

A battery pack 42 is contained as a functional component in the battery container 38. The battery pack 42 functions as a driving power supply for the portable computer 1, when the portable computer 1 is used in a place where a commercial AC power supply is not available. The battery pack 42 is removably inserted in the battery container 38 through the opening portion 35.

The battery pack 42 has a battery case 43. The battery case 43 has a rectangular box shape with such a size as to permit tight fitting in the battery container 38. The battery case 43 has a plurality of contacts (not shown) at one end thereof facing the holder 36. These contacts come into contact with the connection terminals 41 of battery connector 40 when the battery pack 42 is put in the battery container 38.

As is shown in FIG. 5, an eject ribbon 45 is disposed on the bottom of the battery container 38. The ribbon 45 is formed of a synthetic resin sheet material. The ribbon 45 has both solidity and flexibility so that it can keep its straight shape. The ribbon 45 has a first end portion 45a and a second end portion 45b. The first end portion 45a of ribbon 45 is engaged on the bottom of the battery container 38 at a position away from the battery connector 40. The second end portion 45 of ribbon 45 is projected upward from the opening portion 35 of housing 4.

Figure 6:
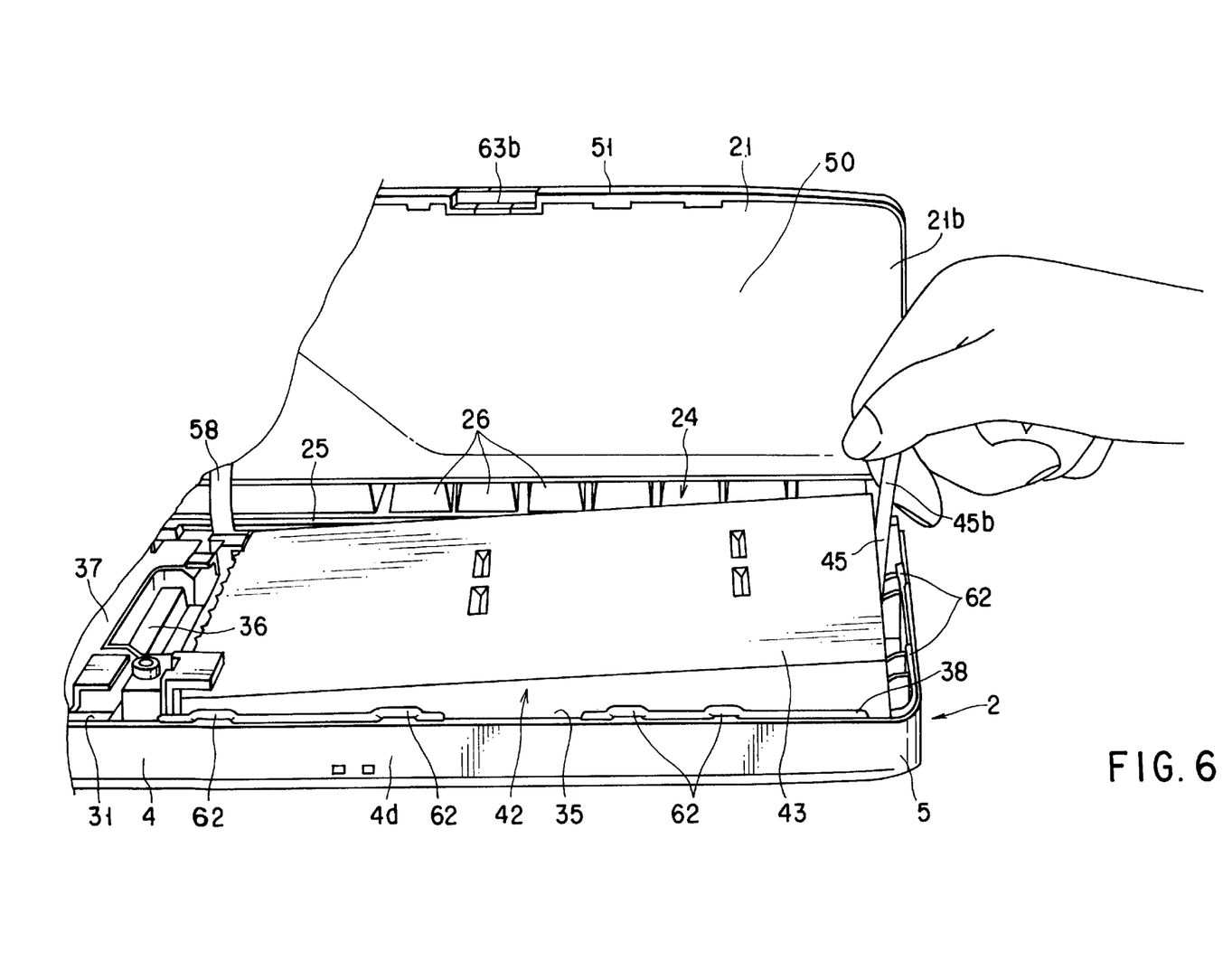
FIG. 6 is a perspective view showing the state in which a battery pack is taken out of the battery container.

As is shown in FIG. 2, in the state in which the battery pack 42 is received in the battery container 38, a portion of the ribbon 45, which adjoins the first end portion 45a is clamped between the bottom of the battery container 38 and the battery case 43. As a result, the second end portion 45b of ribbon 45 is led out upward of the battery back 42 through a gap between the battery case 43 and battery container 38. If the second end portion 45b of ribbon 45 is held by the fingers and pulled up, as shown in FIG. 6, the battery pack 42 can be lifted from the battery container 38 by means of the ribbon 45 and the battery pack 42 can be taken out of the opening portion 35.

The front cover 21 of upper housing 6 serves to open/close the opening portion 35 of second receptacle 31. The front cover 21 is located in front of the key board 24. The front cover 21 integrally includes a flat top wall 50 extending in the width direction of the housing 4 and a peripheral wall 51 extending downward from the front, right-hand, and left-hand edges of the top wall 50. The top wall 50 of front cover 21 has a left end portion 21a and a right end portion 21b spaced apart in the width direction of the housing 4. The top wall 50 serves also as a palm-rest 52 on which the operator will rest his/her palms while operating the keyboard 24.

A pair of click switch buttons 54a and 54b functioning as switch operating members are disposed at a substantially central portion of the palm-rest 52. The click switch buttons 54a and 54b are operated to execute or cancel commands when the joystick 27 is actuated. The click switch buttons 54a and 54b are manually operated by the fingertip of the hand rested on the palm-rest 52.

As is shown in FIGS. 2 to 4, a metallic inner panel 55 is screwed on the bottom surface of the top wall 50. A pair of click switches 56a and 56b are disposed between the inner panel 55 and the bottom surface of the top wall 50. The click switches 56a and 56b are turned on/off by the click switch buttons 54a and 54b. The click switches 56a and 56b are supported on a flat flexible wiring plate 57. The wiring plate 57 is held on the bottom surface of the top wall 50 by means of the inner panel 55.

The wiring plate 57 integrally includes a flexible cable member 58 as a wiring member. The cable member 58 has a strip shape, with wiring patterns (not shown) formed on one side thereof. The wiring patterns are electrically connected to the click switches 56a and 56b. The cable member 58 extends away from the wiring plate 57. The cable member 58 has a terminal portion 59 at its distal end portion and the wiring patterns are led to the terminal portion 59.

As is best shown in FIG. 3, the cable member 58 is introduced into the first receptacle 30 from the vicinity of the holder 36 of the second receptacle 31. The terminal portion 59 of cable member 58 is connected to a cable connector 60 on the circuit board 14 under the keyboard 24. Thus, the cable member 58 extends between the front cover 21 and housing 4.

The front cover 21, as described above, is coupled to the housing 4 so as to be movable between a first position where the front cover 21 covers the opening portion 35 of housing 4 and a second position where the front cover 21 is turned away from the opening portion 35. FIGS. 1 and 3 show the state in which the front cover 21 is shifted to the first position. In this state, the peripheral wall 51 of front cover 21 is continuous with the peripheral walls 5a of lower housing 5, and the top wall 50 of front wall 21 faces the opening portion 35. As is shown in FIG. 5, a plurality of engaging projections 62 are disposed on the upper end portion of the peripheral walls 5a of lower housing 5 which are continuous with opening edge portions of the opening portion 35. The engaging projections 62 are detachably engaged with the inner surface of the peripheral wall 51 of front cover 21. Thereby, the front cover 21 and lower housing 5 are positioned.

A pair of latches 63a and 63b are disposed on the front end portion of front cover 21. The latches 63a and 63b function to hold the front cover 21 in the first position. The latches 63a and 63b are detachably hooked on the front end portion of the peripheral walls 5a of lower housing 5.

Figure 7A:
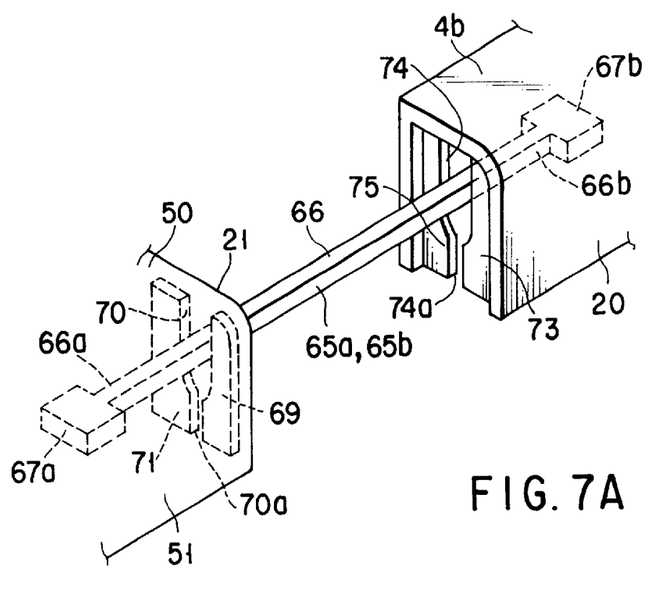
FIG. 7A is a perspective view showing the state in which the front cover is coupled to the housing by means of a coupling member.

As is shown in FIG. 2, the front cover 21 is coupled to the housing 4 by means of a pair of coupling members 65a and 65b. The coupling members 65a and 65b are formed of a rubber-like elastic material. The coupling member 65a, 65b has a resiliently deformable rod-like body 66, as shown in FIG. 7A. The body 66 has a first end portion 66a and a second end portion 66b positioned opposite to the first end portion 66a. The first end portion 66a is integrally provided with a first engaging portion 67a having a greater size than the body 66. Similarly, the second end portion 66b is integrally provided with a second engaging portion 67b having a greater size than the body 66.

Figure 7B:
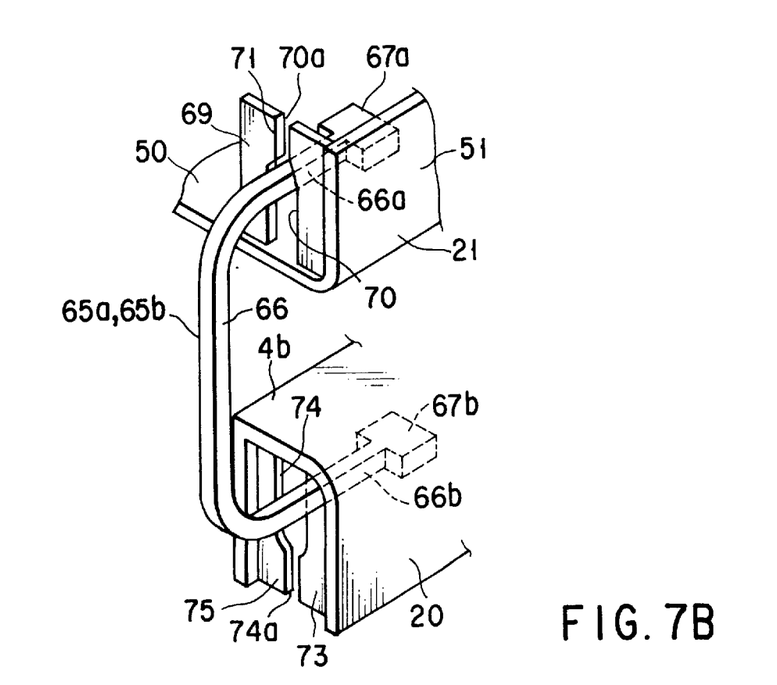
FIG. 7B is a perspective view showing the state in which the coupling member for coupling the front cover and the housing is bent.

The coupling members 65a and 65b straddle between the housing body 20 and the left and right end portions 21a and 21b of front cover 21. Each of the left and right end portions 21a and 21b of front cover 21 has an engaging wall 69. The engaging walls 69 are provided at a rear end portion of the bottom surface of top wall 50. As is shown in FIGS. 7A and 7B, each engaging wall 69 has a slit 70 through which the body 66 of the coupling member 65a, 65b can be passed. The slit 70 includes an insertion hole 70a opening to the side away from the top wall 50. An end portion of the slit 70, which is continuous with the insertion hole 70a, is provided with a stopper portion 71 which decreases the width of the slit 70. Accordingly, the body 66 of coupling member 65a, 65b is pushed into the slit 70 from insertion hole 70a while it is resiliently deformed, and thus the coupling member 65a, 65b is coupled to the front cover 21. In the state in which the body 66 is pushed into the slit 70, the presence of the stopper portion 71 and first engaging portion 67a prevents the body 66 from being removed from the slit 70.

The housing body 20 has a pair of support walls 73 corresponding to the engaging walls 69 of front cover 21.

The support walls 73 are spaced apart in the width direction of the housing 4 at a front end portion of the housing body 20. As is shown in FIGS. 7A and 7B, the support wall 73 has a slit 74 through which the body 66 of the coupling member 65a, 65b can be passed. The slit 74 has an insertion hole 74a opening downward. An end portion of the slit 74, which is continuous with the insertion hole 74a, is provided with a stopper portion 75 which decreases the width of the slit 74. Accordingly, the body 66 of coupling member 65a, 65b is pushed into the slit 74 from insertion hole 74a while it is resiliently deformed, and thus the coupling member 65a, 65b is coupled to the housing body 20. In the state in which the body 66 is pushed into the slit 74, the presence of the stopper portion 75 and second engaging portion 67b prevents the body 66 from being removed from the slit 74.

The front cover 21 is thus coupled to the housing 4 by means of the coupling members 65a and 65b. If the front cover 21 is raised and turned to lie over the keyboard 24, the coupling members 65a and 65b are bent in U-shape. Accordingly, the front cover 21 is shifted to the second position where the front cover 21 is separated from the opening portion 35.

In the present embodiment, the length of the coupling member 65a, 65b is set to be less than the entire length of the cable member 58 connecting the click switches 56a and 56b and circuit board 14. The cable member 58 is located between the coupling members 65a and 65b.

In the portable computer 1 with the above structure, when the battery pack 42 is to be taken out of the battery container 38 of hosing 4 or to be inserted into the battery container 38, the latches 63a and 63b are first operated to release the coupling between the lower housing 5 and front cover 21.

Following this, the front cover 21 is lifted and shifted from the first position. In this case, since the coupling members 65a and 65b coupling the front cover 21 and housing body 20 are resiliently deformable, their bodies 66 can be bent in desired shapes at desired positions. If the front cover 21 separated from the lower housing 5 is turned to lie over the rearward keyboard 24, the bodies 66 of coupling members 65a and 65b are bent in U-shape, as shown in FIG. 7B. As a result, as shown in FIG. 2, the front cover 21 can be turned about 180 degrees to the second position where the front cover 21 is folded over the keyboard 24.

Accordingly, the front cover 21 does not remain upright near the rear end of the opening portion 35. The surrounding region of the opening portion 35 can be widely opened upward of the housing 4. Therefore, when the battery pack 42 is inserted/removed in/from the battery container 38, the front cover 21 does not hinder such actions and the battery pack 42 can be easily inserted and taken out.

Moreover, accordingly to the above structure, the front cover 21 and the housing body 20 of housing 4 may be simply coupled by means of the coupling members 65a and 65b. There is no need to provide an intricate link mechanism between the front cover 21 and housing body 20. In addition, since the front cover 21 is coupled to the hosing body 20 by means of the coupling members 65a and 65b, there is no need to provide a special mechanism for locking the front cover 21 in the first position. Although the front cover 21 is constructed to be rotatable between the first and second positions, the support structure for the front cover 21 can be simplified. Therefore, the cost, size and weight of the portable computer 1 can be reduced.

Moreover, in the state in which the front cover 21 has been shifted to the second position, the front cover 21 is not completely separated from the housing 4 since it is coupled to the housing body 20 by means of the coupling members 65a and 65b. Accordingly, it is possible to prevent the front cover 21 from being lost when the opening portion 35 is uncovered. Besides, there is no need to find where to place the front cover 21.

In the case of moving the front cover 21 from the first position to the second position, if the front cover 21 has been moved by a distance corresponding to the entire length of each coupling member 65a, 65b, the front cover 21 cannot be further moved. In particular, in the above structure, since the entire length of each coupling member 65a, 65b is set to be shorter than the entire length of the cable member 58, the cable member 58 can be moved with an allowance even if the coupling members 65a and 65b are pulled to a maximum extent by the movement of the front cover 21. Accordingly, when the front cover 21 has been shifted from the first position to the second position, a large tensile force does not act on the cable member 58 and an excessive force is not applied to the connecting portion between the cable member 58 and circuit board 14. Therefore, it is possible to prevent breaking of the cable member 58 or damage to the connecting portion between the cable member 58 and circuit board 14, and the reliability of electrical connection is enhanced.

The present invention is not limited to the first embodiment. A second embodiment of the invention will now be described with reference to FIGS. 8 to 10.

The second embodiment differs from the first embodiment, in particular, with respect to the structure of the second receptacle 31 covered by the front cover 21 and the structure for fixing the front cover 21 in the first position. In the second embodiment, the structural parts common to those in the first embodiment are denoted by like reference numerals and a description thereof is omitted.

Figure 8:
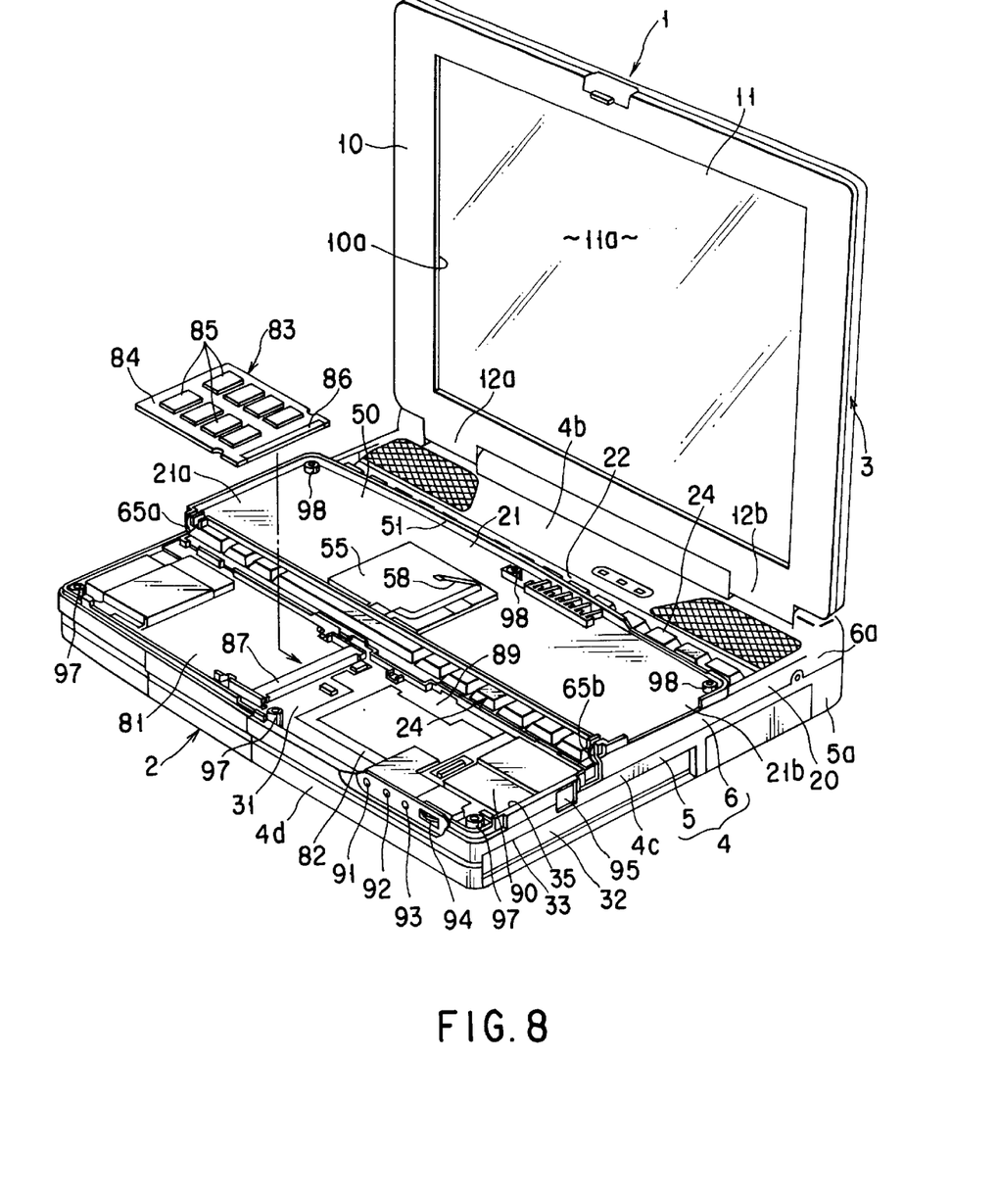
FIG. 8 is a perspective view of a portable computer according to a second embodiment of the invention.
Figure 9:
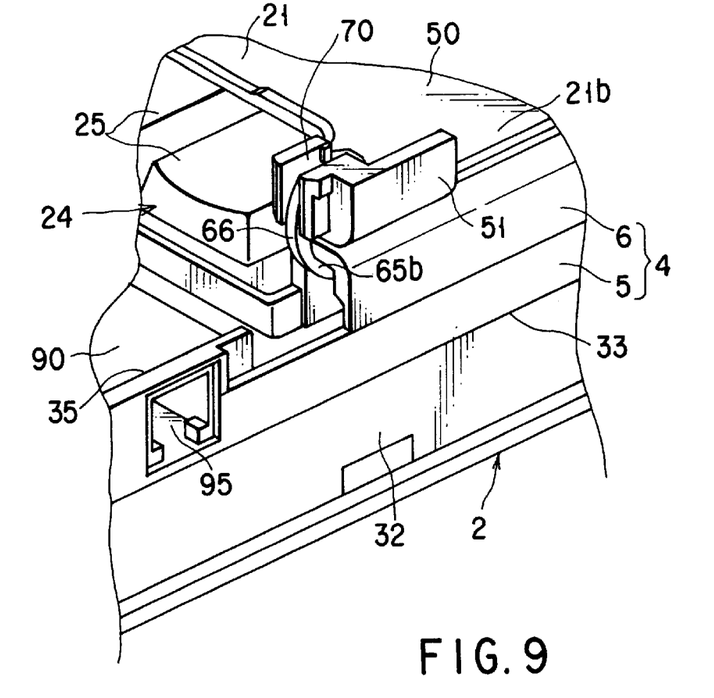
FIG. 9 is a perspective view showing the state in which the front cover is coupled to the housing by means of a coupling member.

As is shown in FIG. 8, the second receptacle 31 is divided into a memory extension chamber 81 and a board containing chamber 82. The memory extension chamber 81 and board containing chamber 82 are juxtaposed in the width direction of the housing 4 and communicate with the opening portion 35. The memory extension chamber 81 serves to receive an extension memory 83 as a functional component. The extension memory 83 comprises a memory board 84 and a plurality of semiconductor packages 85 mounted on the memory board 84. A terminal section 86 is provided at one end of the memory board 84. A memory socket 87, in which the terminal section 86 of extension memory 83 is to be inserted, is disposed on the bottom surface of the memory extension chamber 81.

The extension memory 83 is put in the memory extension chamber 81 in the state in which the front cover 21 is shifted to the second position. The extension memory 83 is electrically connected to the portable computer 1, with the terminal section 86 of memory board 84 inserted in the memory socket 87. The memory board 84 is fixed to the bottom surface of the memory extension chamber 81 by means of screws (not shown).

An audio board 89 and a MODEM 90 are mounted in the board containing chamber 82. The audio board 89 is fixed to the bottom surface of the board containing chamber 82 by means of screws (not shown). The audio board 89 includes a sound input terminal 91, a microphone input terminal 92, a headphone output terminal 93 and a volume dial 94. These terminals 91 to 93 and volume dial 94 are exposed to the front wall 4d of housing 4.

The MODEM 90 is placed on the audio board 89. The MODEM 90 has a modular jack 95 for connection with a telephone line. The modular jack 95 is exposed to the right-hand side wall 4c of housing 4.

As is shown in FIG. 8, the lower housing 5 of housing 4 has three boss portions 97. The boss portions 97 are arranged at intervals in the width direction of the housing 4 at locations adjoining the front wall 4d of housing 4. These boss portions 97 extend upward from the bottom wall 4a of housing 4, and their distal end portions face the opening portion 35.

Figure 10:
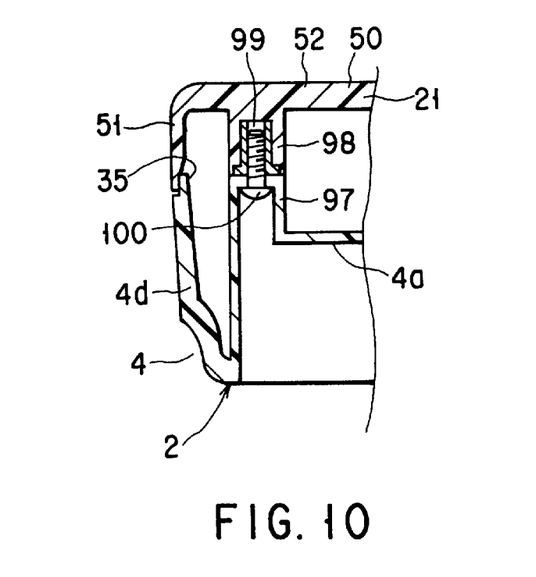
FIG. 10 is a perspective view showing the state in which the front cover is fixed to the housing by means of a screw.

Three seat portions 98 are formed on the bottom surface of the top wall 50 of front cover 21. The seat portions 98 are abutted upon the distal end portions of the boss portions 97 when the front cover 21 is shifted to the first position. As is shown in FIG. 10, each seat portion 98 has a screw hole 99. A screw 100 is passed through each boss portion 97 from the lower side of housing 4. The screw 100 is turned into the screw hole 99 and thereby the front cover 21 is fixed to the lower housing 5.

According to this structure, too, the front cover 21 is coupled to the housing body 20 by means of the coupling members 65a and 65b of rubber-like elastic material. The memory extension chamber 81 can be widely opened to the above of the housing body 4 when the extension memory 83 is provided in the memory extension chamber 81. Therefore, the front cover 21 does not hinder the work for providing the extension memory 83 and facilitates this work.

In the above embodiments, the coupling members are formed of rubber-like elastic material. However, this invention is not limited to this and the coupling members may be formed of a synthetic-resin strip-like sheet material or cords.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a housing including a receptacle for removably receiving a functional component, and an opening portion for inserting/taking out the functional component into/from the receptacle;
   a cover attached to the housing to cover the opening portion of the housing, the cover being movable between a first position where the cover covers the opening portion and a second position where the cover is shifted away from the opening portion; and
   a flexible coupling member for coupling the housing and the cover;
   wherein said coupling member comprises an elongated flexible body having first and second ends, a first engaging portion disposed at the first end of said body and a second engaging portion disposed at the second end of said body, the first engaging portion is coupled to the cover, the second end portion is coupled to the housing, and the cover is selectively movable between the first and second positions upon deformation of said body.

2. The electronic apparatus according to claim 1, wherein the housing includes a top wall on which input means for inputting information is disposed, and a circuit board situated below the input means,
   the opening portion of the housing extends in a width direction of the housing in front of the input means, and
   the cover serves also as a palm-rest which is continuous with the input means when the cover is shifted to the first position.

3. The electronic apparatus according to claim 1, wherein said flexibly body is formed of a rod-shaped rubber-like resilient body.

4. The electronic apparatus according to claim 1, wherein the cover has first and second end portions spaced apart in a width direction of the housing, and the first and second end portions of the cover are coupled to the housing by means of coupling members.

5. The electronic apparatus according to claim 1, wherein the cover has a latch for holding the cover in the first position.

6. The electronic apparatus according to claim 1, wherein the cover is held in the first position by means of at least one screw.

7. The electronic apparatus according to claim 2, wherein the cover includes a manually operable switch member and a switch which is turned on/off by means of the switch member, the switch being electrically connected to the circuit board by means of a flexible wiring member.

8. The electronic apparatus according to claim 3, wherein the coupling member has a length less than a length of the wiring member.

9. An electronic apparatus comprising:
   a housing containing a circuit board;
   a receptacle formed in the housing and removably receiving a functional component, the receptacle having an opening portion;
   a cover attached to the housing to cover the opening portion of the housing from the above side of the housing, the cover being movable between a first position where the cover covers the opening portion and a second position where the cover is shifted away from the opening portion, the cover including a manually operable switch member and a switch which is turned on/off by means of the switch member, the switch being electrically connected to the circuit board by means of a wiring member; and
   a flexible coupling member for coupling the housing and the cover;
   wherein said coupling member comprises an elongated flexible body having first and second ends, a first engaging portion disposed at the first end of said body and a second engaging portion disposed at the second end of said body, the first engaging portion is coupled to the cover, the second end portion is coupled to the housing, and the cover is selectively movable between the first and second positions upon deformation of said body.

10. The electronic apparatus according to claim 9, wherein the housing includes a top wall on which input means for inputting information is disposed,
    the opening portion of the housing extends in a width direction of the housing in front of the input means, and
    the cover serves also as a palm-rest which is continuous with the input means when the cover is shifted to the first position.

11. The electronic apparatus according to claim 10, wherein the cover has first and second end portions spaced apart in a width direction of the housing, and the first and second end portions of the cover are coupled to the housing by means of coupling members.

12. The electronic apparatus according to claim 11, wherein the coupling member has a length less than a length of the wiring member.

13. An electronic apparatus comprising:
    a housing including a top wall on which input means for inputting information is disposed, a receptacle for removably receiving a functional component, and an opening portion for insertion/removal of the functional component in/from the receptacle, the opening portion being located in front of the input means;

a circuit board contained in the housing;

a palm-rest attached to the housing on an operator's side of the input means, the palm-rest being movable between a first position where the palm-rest covers the opening portion and a second position where the palm-rest is shifted away from the opening portion, the palm-rest including first and second end portions spaced apart in a width direction of the housing, a switch member situated between the first and second end portions and a switch which is turned on/off by means of the switch member, the switch being electrically connected to the circuit board by means of a wiring member; and a pair of flexible coupling members for coupling the housing and the first and second end portions of the palm-rest;

wherein each of said coupling members comprises an elongated flexible body having first and second ends, a first engaging portion disposed at the first end of said body and a second engaging portion disposed at the second end of said body, the first engaging portions of the coupling members are coupled to the first and second end portions of the palm-rest, the second engaging portions of the coupling members are coupled to the housing, and the palm-rest is selectively movable between the first and second positions upon deformation of said body.

14. An electronic apparatus comprising:

a housing including a receptacle for removably receiving a functional component, and a opening portion for inserting/taking out the functional component into/from the receptacle;

a cover attached to the housing to cover the opening portion of the housing, the cover being movable between a first position where the cover covers the opening portion and a second position where the cover is shifted away from the opening portion;

a flexible coupling member for coupling the housing and the cover, the flexible coupling member comprising an elongated flexible body having first and second ends, a first engaging portion disposed at the first end of said body and a second engaging portion disposed at the second end of said body, the first engaging portion being coupled to the cover, the second end portion being coupled to the housing, and the cover being selectively movable between the first and second positions upon deformation of said body; and a display unit supported on the housing to be rotatable between a closed position where the display unit is placed over the housing so as to conceal the cover, and an open position where the cover is exposed.

* * * * *

UNITED STATES PATENT AND TRADEMARK OFFICE
CERTIFICATE OF CORRECTION

PATENT NO. : 6,175,488 B1
DATED : January 16, 2001
INVENTOR(S) : Masaru Seto et al.

It is certified that error appears in the above-identified patent and that said Letters Patent is hereby corrected as shown below:

Title page,
Item [57], ABSTRACT,
Line 7, "is-shifted" should read -- is shifted --.

Column 12,
Line 2, "flexibly body" should read -- flexible body --.
Line 19, "claim 3" should read -- claim 7 --.

Column 14,
Line 5, "a opening" should read -- an opening --.

Signed and Sealed this

Ninth Day of July, 2002

Attest:

Attesting Officer

JAMES E. ROGAN
Director of the United States Patent and Trademark Office